(12) United States Patent
Na et al.

(10) Patent No.: US 10,694,190 B2
(45) Date of Patent: Jun. 23, 2020

(54) PROCESSING APPARATUSES AND CONTROLLING METHODS THEREOF

(71) Applicant: SAMSUNG ELECTRONICS CO., LTD., Suwon-si (KR)

(72) Inventors: Sang-kwon Na, Seoul (KR); Ki-won Yoo, Seoul (KR); Doo-hyun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 15/716,995

(22) Filed: Sep. 27, 2017

(65) Prior Publication Data
US 2018/0124412 A1 May 3, 2018

(30) Foreign Application Priority Data
Nov. 1, 2016 (KR) .................. 10-2016-0144460

(51) Int. Cl.
*H04N 19/159* (2014.01)
*H04N 19/167* (2014.01)
(Continued)

(52) U.S. Cl.
CPC ......... *H04N 19/159* (2014.11); *H04N 19/119* (2014.11); *H04N 19/129* (2014.11);
(Continued)

(58) Field of Classification Search
CPC ..... H04N 19/439; H04N 19/44; H04N 19/433
(Continued)

(56) References Cited

U.S. PATENT DOCUMENTS

| | | |
|---|---|---|
| 7,912,128 B2 | 3/2011 | Hsieh et al. |
| 8,213,513 B2 | 7/2012 | Huang et al. |

(Continued)

FOREIGN PATENT DOCUMENTS

| | | |
|---|---|---|
| KR | 10-2007-0029044 A | 3/2007 |
| KR | 10-2009-0020184 A | 2/2009 |

(Continued)

OTHER PUBLICATIONS

Communication dated Apr. 5, 2018 issued by the International Searching Authority in counterpart International Patent Application No. PCT/KR2017/011667 (PCT/ISA/210).

(Continued)

*Primary Examiner* — Christopher S Kelley
(74) *Attorney, Agent, or Firm* — Sughrue Mion, PLLC

(57) ABSTRACT

A processing apparatus has a processor including a first memory. The processor divides a frame in video content into a plurality of coding units (CUs), and encodes the plurality of CUs in a diagonal direction to generate an encoded frame, wherein when a first CU is encoded based on a first encoding type, the processor is further configured to load, from a second memory, a first partial region of a reference frame corresponding to first position information of the first CU to the first memory and encode the first CU based on the first partial region of the reference frame loaded from the second memory, and wherein, when the first CU is encoded based on a second encoding type, the processor is further configured to encode the first CU based on a first reference pixel value corresponding to the first position information of the first CU from the first memory.

11 Claims, 17 Drawing Sheets

(51) Int. Cl.
  *H04N 19/182* (2014.01)
  *H04N 19/119* (2014.01)
  *H04N 19/176* (2014.01)
  *H04N 19/433* (2014.01)
  *H04N 19/129* (2014.01)

(52) U.S. Cl.
  CPC ......... *H04N 19/167* (2014.11); *H04N 19/176* (2014.11); *H04N 19/182* (2014.11); *H04N 19/433* (2014.11)

(58) Field of Classification Search
  USPC .................................................. 375/239–241
  See application file for complete search history.

(56) References Cited

U.S. PATENT DOCUMENTS

| | | | |
|---|---|---|---|
| 9,336,558 | B2 | 5/2016 | Cote et al. |
| 2006/0171685 | A1 | 8/2006 | Chen et al. |
| 2008/0137726 | A1 | 6/2008 | Chatterjee et al. |
| 2012/0307904 | A1 | 12/2012 | Yi et al. |
| 2013/0272370 | A1 | 10/2013 | Coban et al. |
| 2014/0146883 | A1 | 5/2014 | Zhang et al. |
| 2015/0296213 | A1* | 10/2015 | Hellman ................ H04N 19/44 375/240.01 |
| 2016/0150244 | A1 | 5/2016 | Seo et al. |

FOREIGN PATENT DOCUMENTS

| | | |
|---|---|---|
| KR | 10-2013-0021548 A | 3/2013 |
| KR | 10-2015-0107727 A | 9/2015 |
| KR | 10-2016-0061172 A | 5/2016 |
| WO | 2007/079782 A1 | 7/2007 |

OTHER PUBLICATIONS

Communication dated Apr. 5, 2018 issued by the International Searching Authority in counterpart International Patent Application No. PCT/KR2017/011667 (PCT/ISA/237).

Communication dated Apr. 26, 2019 issued by the European Intellectual Property Office in counterpart European Application No. 17866674.9.

Communication dated Jan. 3, 2020, issued by the European Patent Office in counterpart European Application No. 17 866 674.9.

\* cited by examiner

FIG. 4

| ROW 0 | 0 | 1 | 2 | 3 | 4 | 5 | 6 | 7 | 8 | 9 |
|---|---|---|---|---|---|---|---|---|---|---|
| ROW 1 | 2 | 3 | 4 | 5 | 6 | 7 | 8 | 9 | 10 | 11 |
| ROW 2 | 4 | 5 | 6 | 7 | 8 | 9 | 10 | 11 | 12 | 13 |

PROCESSING APPARATUSES AND CONTROLLING METHODS THEREOF

CROSS-REFERENCE TO RELATED APPLICATIONS

This application claims priority from Korean Patent Application No. 10-2016-0144460, filed on Nov. 1, 2016 in the Korean Intellectual Property Office, the disclosure of which is incorporated herein by reference in its entirety.

BACKGROUND

Field

Apparatuses and methods consistent with the present disclosure relate to processing apparatuses and controlling methods thereof, and more particularly, to processing apparatuses and controlling methods thereof, for performing inter encoding (i.e., inter frame encoding) and intra encoding (i.e., intra frame encoding).

Description of the Related Art

In recent development of an image processing technology, high-resolution images such as an ultra high definition (UHD) image have become widely popular. To provide high-resolution images, there is a need for a high-efficiency image compression technology.

The image compression technology includes apparatuses, methods and systems for dividing one frame into a plurality of blocks to reduce the number of bits to be processed and removing temporal and spatial redundancy with respect to each block to compress data of an image and encodes an image. A method of removing spatial redundancy by compressing an image using a neighboring pixel of a target block to be encoded is generally referred to as intra encoding. A method of removing spatial redundancy by compressing an image by using a reference block of a different frame that is compressed prior to a target block is referred to as inter encoding.

During intra encoding, a prediction pixel is generated using a neighboring (upper) pixel in an image and, during inter encoding, a prediction pixel is generated using a pixel of a previous reference frame. In addition, encoding is performed using a finally determined prediction method from the intra encoding and the inter encoding and information on a pixel restored after encoding is stored in a memory to reuse the restored pixel in a next frame.

However, in the related art, with respect to a plurality of target blocks included in one frame, when target blocks included in a first row are sequentially encoded from a left side to a right side and the encoding of the target blocks included in the first row is completed, target blocks included in a second row after the first row are sequentially encoded from a left side to a right side.

In this case, it is not possible to reuse data such as reusable surrounding coding information, an upper pixel, and a previous reference frame. Accordingly, research has been conducted into a method of achieving high performance of UHD-class video codec to effectively use a memory.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides processing apparatuses and controlling methods thereof, for effectively managing a first memory configured separately from a processor and a second memory included in the processor and enhancing performance of the first and second memories.

According to an aspect of an exemplary embodiment, there is provided a processing apparatus comprising: a processor comprising a first memory, the processor configured to: divide a frame in video content into a plurality of coding units (CUs), and encode the plurality of CUs in a diagonal direction to generate an encoded frame; wherein when a first CU is encoded based on a first encoding type, the processor is further configured to load, from a second memory, a first partial region of a reference frame corresponding to first position information of the first CU to the first memory and encode the first CU based on the first partial region of the reference frame loaded from the second memory, and wherein, when the first CU is encoded based on a second encoding type, the processor is further configured to encode the first CU based on a first reference pixel value corresponding to the first position information of the first CU from the first memory.

The processor may be further configured to encode the plurality of CUs from an upper-right end toward a lower-left end.

The first encoding type may be inter encoding; and upon completing the inter encoding of the first CU, the processor may be further configured to load a region of a second partial region of the reference frame corresponding to second position information of a second CU, which does not overlap with the first partial region, to the first memory and encode the second CU.

Upon completing the inter encoding of the first CU, the processor may be further configured to delete a region of the first partial region of the reference frame stored in the first memory, which is not used in inter encoding of the second CU.

The first CU may be a currently encoded CU and the second CU may be next CU that is encoded subsequent to the first CU.

The second encoding type is intra encoding and upon completing the intra encoding of the first CU, the processor may be further configured to restore the intra encoded first CU, store a second reference pixel value to be used in intra encoding of a second CU in the first memory, and delete a third reference pixel value that is not used in intra encoding of the second CU among reference pixel values stored in the first memory.

The processor may be further configured to determine an extended region in the first CU as the first partial region of the reference frame based on a region corresponding to the first position information of the first CU and determine one or more pixel values outside the first CU and a third CU adjacent to the first CU, as the first reference pixel value based on the first position information of the first CU.

According to an aspect according to an exemplary embodiment, a processing apparatus comprising: a processor comprising a first memory configured to decode an encoded frame included in encoded video content on a coding unit (CU)-by-CU basis and, generate a decoded frame, wherein, when a first CU is decoded based on a first decoding type, the processor may be configured to load a first partial region of a reference frame corresponding to first position information of the first CU to the first memory from a second memory and decodes the first CU based on the first partial region of the reference frame loaded from the second memory; wherein, when the first CU is decoded based on a second decoding type, the processor may be further configured to decode the first CU by using a reference pixel value corresponding to first position information of the first CU from the first memory; and wherein the processor may be further configured to further configured to arrange plurality of decoded CUs in a diagonal direction and generates the decoded frame.

The first decoding type may be inter decoding; wherein, upon completing the inter decoding of the first CU, the processor may be further configured to further configured to load a region of a second partial region of the reference frame corresponding to second position information of a second CU, which does not overlap with the first partial region, to the second memory and decodes the second CU; and wherein the processor may be further configured to arranges the plurality of decoded CUs in the diagonal direction toward a lower-left end from an upper-right end and generates the decoded frame.

Upon completing the inter decoding of the first CU, the processor may be further configured to delete a region of the first partial region of the reference frame stored in the first memory, which is not used in inter encoding of the second CU.

The second decoding type may be intra decoding; wherein the processor may be further configured to store a first reference pixel value to be used in intra decoding of a second CU in the second memory during the intra decoding of the first CU and, upon completing the intra decoding of the first CU, the processor may be further configured to delete a second reference pixel value that is not used in intra decoding of the second CU among reference pixel values stored in the first memory; and wherein the processor may be further configured to arrange the plurality of decoded CUs in the diagonal direction toward a lower-left end from an upper-right end and generates the decoded frame.

The processor may be further configured to determine an extended region as the first partial region of the reference frame based on a region corresponding to the first position information of the first CU and determine one or more pixel values outside the first CU and a third CU adjacent to the first CU as the first reference pixel value based on the first position information of the first CU.

According to an aspect of an exemplary embodiment, there is provided a controlling method of a processing apparatus, the method comprising: dividing, by a processor, a frame included in video content into a plurality of coding units (CUs); and encoding the plurality of CUs in a diagonal direction to generate an encoded frame, wherein when a first CU is encoded based on a first encoding type, loading a first partial region of a reference frame corresponding to first position information of the first CU to a first memory included in the processor, from a second memory, and encoding the first CU based on the first partial region of the reference frame loaded from the second memory, and wherein, when the first CU is encoded based on a second encoding type, encoding the first CU based on a first reference pixel value corresponding to the first position information of the first CU from the first memory.

The plurality of CUs may be encoded from an upper-right end toward a lower-left end.

The first encoding type is inter encoding; and wherein upon completing the inter encoding of the first CU, loading a region of a second partial region of the reference frame corresponding to second position information of a second CU, which does not overlap with the first partial region, to the first memory and encoding the second CU.

The method may further comprise, upon completing the inter encoding of the first CU, deleting a region of the first partial region of the reference frame stored in the first memory, which is not used in inter encoding of the second CU.

The first CU may be a currently encoded CU and the second CU may be next CU that is encoded subsequent to the first CU.

The second encoding type may be intra encoding; and upon completing the intra encoding of the first CU, restoring the intra-encoded first CU, storing a second reference pixel value to be used in intra encoding of a second CU in the second memory, and deleting a third reference pixel value that is not used in intra encoding of the second CU among reference pixel values stored in the first memory.

The generating of the encoded frame may comprise determining an extended region in the first CU as the first partial region of the reference frame based on a region corresponding to the first position information of the first CU and determining one or more pixel values outside the first CU and a third CU adjacent to the first CU as the first reference pixel value based on the first position information of the first CU.

According to an aspect of an exemplary embodiment, there is provided a controlling method of a processing apparatus, the method comprising: decoding, by a processor, an encoded frame included in encoded video content on a coding unit (CU)-by-CU basis; and arranging plurality of decoded CUs in a diagonal direction and generating a decoded frame, wherein, when a first CU is decoded based on a first decoding type, loading a first partial region of a reference frame corresponding to first position information of the first CU to a first memory of the processor from a second memory and decoding the first CU based on the first partial region of the reference frame loaded from the second memory; wherein, when the first CU is decoded based on a second decoding type, decoding the first CU by using a reference pixel value corresponding to first position information of the first CU from the first memory.

The first decoding type may be inter decoding; wherein, upon completing the inter decoding of the first CU, the decoding comprises loading a region of a second partial region of the reference frame corresponding to second position information of a second CU, which does not overlap with the first partial region, to the first memory and decoding the second CU; and wherein the decoding comprises arranging the plurality of decoded CUs in a diagonal direction toward a lower-left end from an upper-right end and generating the decoded frame.

The method may further comprise, upon completing the inter decoding of the first CU, the decoding comprises deleting a region of the first partial region of the reference frame stored in the second memory, which is not used in inter encoding of the second CU of the first CU.

The second decoding type may be intra decoding; and wherein the decoding comprises storing a first reference pixel value to be used in intra decoding of a second CU in the second memory during the intra decoding of the first CU and, upon completing the intra decoding of the first CU, the decoding comprises deleting a second reference pixel value that is not used in intra decoding of the second CU among reference pixel values stored in the second memory; and wherein the decoding comprises arranging the plurality of decoded CUs in a diagonal direction toward a lower-left end from an upper-right end and generating the decoded frame.

The decoding may comprise determining a preset extended region as the first partial region of the reference frame based on a region corresponding to the first position information of the first CU and determining one or more pixel values outside the first CU and an adjacent CU as the reference pixel value based on the first position information of the first CU.

According to an aspect of an exemplary embodiment, there is provided a processing apparatus comprising: a processor comprising a first memory, the processor configured to: divide a frame in video content into a plurality of coding units (CUs), and inter-frame encode the plurality of CUs in a diagonal direction to generate an encoded frame; wherein when a first CU is encoded, the processor is further configured to load, from a second memory, a first partial region of a reference frame corresponding to first position information of the first CU to the first memory and encode the first CU based on the first partial region of the reference frame loaded from the second memory.

When a second CU is encoded, the processor may be further configured to retrieve the first partial region previously loaded to the first memory, load a second partial region of the reference frame corresponding to second position information of the second CU to the first memory from the second memory, and encode the second CU based on the first partial region and the second partial region.

When a second CU is encoded, the processor may be further configured to delete a first portion of the first partial region, which is not used in inter encoding of a third CU, from the first memory, retrieve a second portion of the first partial region previously loaded to the first memory, load a second partial region of the reference frame corresponding to second position information of the second CU to the first memory from the second memory, and encode the second CU based on the second portion of the first partial region and the second partial region.

According to an aspect of an exemplary embodiment, a processing apparatus comprising: a processor comprising a first memory, the processor configured to: divide a frame in video content into a plurality of coding units (CUs), and intra-frame encode the plurality of CUs in a diagonal direction to generate an encoded frame; wherein, when a first CU is encoded, the processor is further configured to encode the first CU based a first reference pixel value of a first reference pixel above the first CU, a second reference pixel value of a second reference pixel above a second CU, which is right adjacent to the first CU and a pixel value of a pixel within the first CU.

Upon completing the intra-frame encoding of the first CU, the processor may be further configured to restore the intra encoded first CU, store a third reference pixel value to be used in intra encoding of a third CU in the first memory, and delete the first reference pixel value that is not used in intra encoding of the third CU.

Additional and/or other aspects and advantages of the present disclosure will be set forth in part in the description which follows and, in part, will be obvious from the description, or may be learned by practice of the one or more exemplary embodiments of the present disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which:

FIG. 4 is a diagram for explanation of encoding sequences of a plurality of coding units (CUs) according to an exemplary embodiment of the present disclosure;

DETAILED DESCRIPTION OF THE EXEMPLARY EMBODIMENTS

Figure 1:
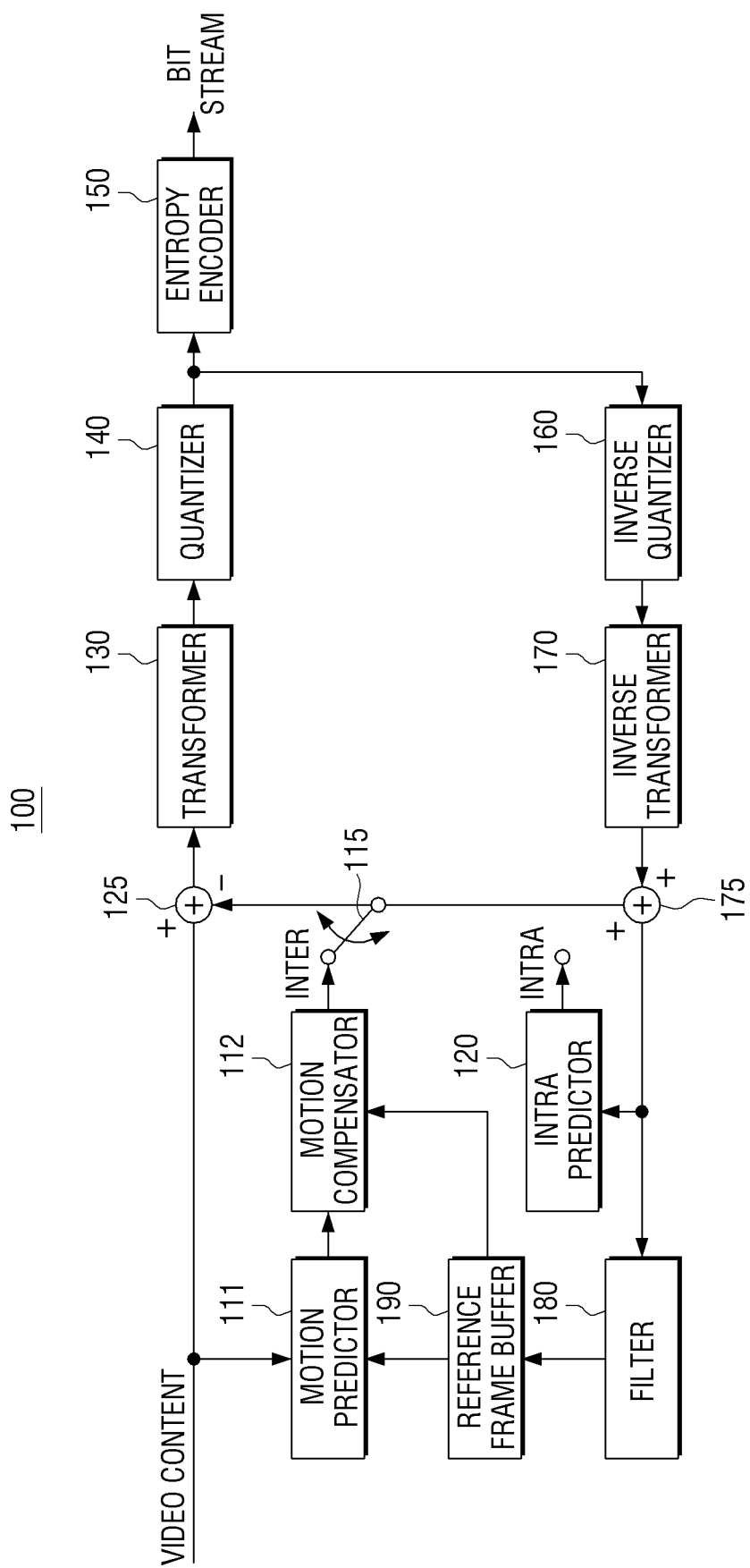
FIG. 1 is a block diagram illustrating a structure of a processing apparatus for encoding according to an exemplary embodiment to aid in the understanding of the present disclosure.

The present disclosure will now be described more fully with reference to the accompanying drawings, in which exemplary embodiments of the present disclosure are shown. However, this is not intended to limit the present disclosure to particular modes of practice, and it is to be appreciated that all modification, equivalents, and alternatives that do not depart from the spirit and technical scope of the present disclosure are encompassed in the present disclosure. With regard to the description of the drawings, the same reference numerals denote like elements.

In this disclosure, it will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Terms used in this disclosure are used to describe specified exemplary embodiments and are not intended to limit the scope of another exemplary embodiment. The terms of a singular form may include plural forms unless otherwise specified. The terms used in the disclosure have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner. As necessary, even terms defined in the specification are not interpreted to exclude exemplary embodiments of the present disclosure.

Hereinafter, various exemplary embodiments of the present disclosure will be described in detail with reference to the accompanying drawings.

FIG. 1 is a block diagram illustrating a structure of a processing apparatus 100 for encoding according to an exemplary embodiment to aid in the understanding of the present disclosure. As shown in FIG. 1, the processing apparatus 100 may include a motion predictor 111, a motion compensator 112, an intra predictor 120, a switch 115, a subtracter 125, a transformer 130, a quantizer 140, an entropy encoder 150, an inverse quantizer 160, an inverse transformer 170, and adder 175, a filter 180, and a reference frame buffer 190.

The processing apparatus 100 may be an apparatus for encoding video content and changing the video content into another signal form. According to an exemplary embodiment, the processing apparatus 100 may encode video content in a first format and changing the video content into a second format. Here, the video content may include a plurality of frames and each frame may include a plurality of pixels. For example, the processing apparatus 100 may be an apparatus for compressing original data that is not processed. The processing apparatus 100 may be an apparatus for changing pre-encoded data into another signal form.

The processing apparatus 100 may be divide each frame into a plurality of blocks and perform encoding the blocks. The processing apparatus 100 may perform encoding on a block-by-block basis via temporal or spatial prediction, transformation, quantization, filtering, and entropy encoding.

Prediction may refer to generation of a similar prediction block to a target block of encoding. Here, a unit of the target block of encoding may be defined as a prediction unit (PU) and prediction may be divided into temporal prediction and spatial prediction.

Temporal prediction refers to prediction between images. The processing apparatus 100 may store one or more reference frames with a high correlation with a frame to be currently encoded and perform inter-prediction using the one or more reference frames. That is, the processing apparatus 100 may generate a prediction block from a reference frame that is restored after previous encoding. In this case, it may be said that the processing apparatus 100 performs inter encoding (i.e., inter frame encoding).

In the case of inter encoding, the motion predictor 111 may search for a block with a highest temporal correlation with the target block in the reference frame stored in the reference frame buffer 190. The motion predictor 111 may interpolate the reference frame and search for a block with a highest temporal correlation with the target block in the interpolated frame.

Here, the reference frame buffer 190 may be a space for storing the reference frame. The reference frame buffer 190 may be used only when prediction between images is performed and may store one or more reference frames with a high correlation with a frame to be currently encoded. The reference frame may be a frame generated by sequentially performing transformation, quantization, inverse quantization, inverse transformation, and filtering on a residual block that will be described below. That is, the reference frame may be a frame that is restored after encoding.

The motion compensator 112 may generate a prediction block based on motion information of a block with a highest temporal correlation with the target block retrieved by the motion predictor 111. Here, the motion information may include a motion vector, a reference frame index, etc.

Spatial prediction refers to prediction in an image, i.e., within a frame of the image. The intra predictor 120 may perform spatial prediction from adjacent pixels that are restored after encoding in a current frame to generate a prediction value of the target block. In this case, it may be said that the processing apparatus 100 performs intra encoding (i.e., intra frame encoding).

Inter encoding or intra encoding may be determined on a coding unit (CU)-by-CU basis. Here, the CU may include at least one prediction unit. When a prediction method of encoding is determined, a position of the switch 115 may be changed to correspond to the prediction method of encoding.

According to an exemplary embodiment, filtering may be applied to the reference frame that is restored after encoding in temporal prediction. However, according to an exemplary embodiment, filtering may not be applied to adjacent pixels that are restored after encoding in spatial prediction.

The subtracter 125 may calculate a difference, between the target block and a prediction block, acquired via temporal prediction or spatial prediction to generate a residual block. According to an exemplary embodiment, the residual block may be a block from which much redundancy is removed via a prediction procedure. However, according to an exemplary embodiment, the residual block may be a block that contains information to be encoded because prediction is not completely performed.

The transformer 130 may transform the residual block after prediction in an image or prediction between images to output a transform coefficient of a frequency band to remove spatial redundancy. In this case, a unit for transformation may be a transform unit (TU) and may be determined irrespective of a prediction unit. For example, a frame including a plurality of residual blocks may be divided into a plurality of TUs irrespective of a prediction unit and the transformer 130 may perform transformation for each TU. According to an exemplary embodiment, division of a TU may be determined according to bit rate optimization.

However, the present disclosure is not limited thereto and a TU may be determined in conjunction with at least one of a CU and a prediction unit according to an exemplary embodiment.

The transformer 130 may perform transformation to concentrate energy of each TU on a specific frequency band. For example, the transformer 130 may perform discrete cosine transform (DCT)-based transformation on each TU to concentrate data on a low frequency band. Alternatively, the transformer 130 may perform discrete Fourier transform (DFT)-based or discrete sine transform (DST)-based transformation.

The quantizer 140 may perform quantization on the transformation coefficient and approximate the transformation coefficient to a representative value of a preset number. That is, the quantizer 140 may map an input value in a specific range to one representative value. During this procedure, a high frequency signal that is barely recognized by the human may be removed and information may be lost.

The quantizer 140 may use one of a uniform quantization method and a non-uniform quantization method according to probability distribution of input data or purpose of quantization. For example, the quantizer 140 may use the uniform quantization method when probability distribution of input data is uniform. The quantizer 140 may use the non-uniform quantization method when probability distribution of the input data is not uniform.

The entropy encoder 150 may variably allocate a length of a symbol according to probability of the symbol with respect to data input from the quantizer 140 to reduce the amount of the data. That is, the entropy encoder 150 may represent the input data in the form of a bit stream of a variable length configured with 0 and 1 based on a probability model to generate a bit stream.

For example, the entropy encoder 150 may allocate a small number of bits to a symbol with high probability and allocate a large number of bits to a symbol with low probability to represent input data. Accordingly, a size of a bit stream of the input data may be reduced and compression performance may be enhanced.

The entropy encoder 150 may perform entropy encoding by using a variable length coding method such as Huffman-coding and exponential-Golomb coding or an arithmetic coding method.

The inverse quantizer 160 and the inverse transformer 170 may receive the quantized transformation coefficient, perform inverse quantization respectively and, then, perform inverse transformation to generate a restored residual block.

The adder 175 may add the restored residual block and the prediction block acquired via temporal prediction or spatial prediction to generate a restored block.

The filter 180 may apply at least one of a deblocking filter, sample adaptive offset (SAO), and an adaptive loop filter (ALF) to the restored image. The filtered restored frame may be stored in the reference frame buffer 190 and used as a reference frame.

Figure 2:
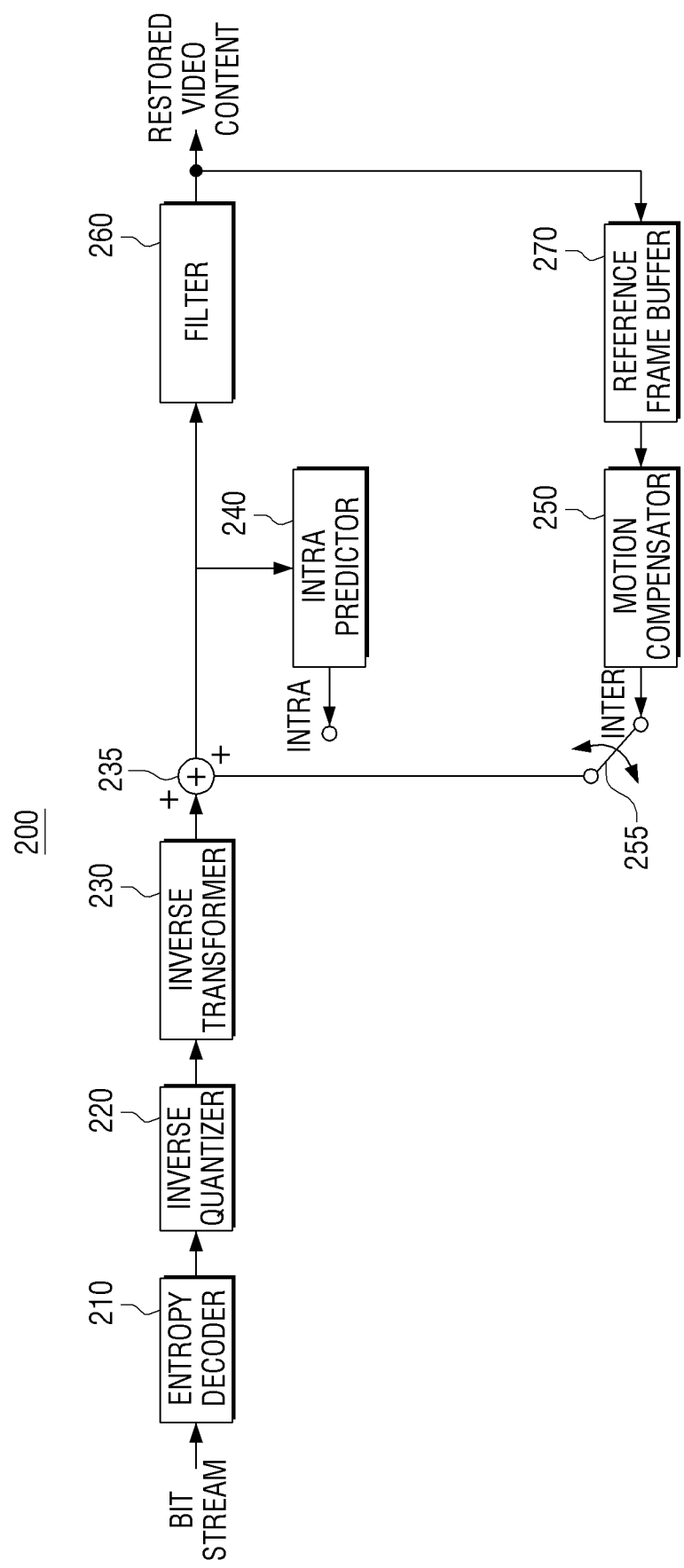
FIG. 2 is a block diagram illustrating a structure of a processing apparatus for decoding according to an exemplary embodiment to aid in the understanding of the present disclosure.

FIG. 2 is a block diagram illustrating a structure of a processing apparatus 200 for decoding according to an exemplary embodiment to aid in the understanding of the present disclosure. As shown in FIG. 2, the processing apparatus 200 may include an entropy decoder 210, an inverse quantizer 220, an inverse transformer 230, an adder 235, an intra predictor 240, a motion compensator 250, a switch 255, a filter 260, and a reference frame buffer 270.

The processing apparatus 200 for decoding may receive a bit stream generated by the processing apparatus 100 for encoding and perform decoding on the bit stream to reconfigure video. The processing apparatus 200 may perform decoding on a block-by-block basis via entropy decoding, inverse quantization, inverse transformation, filtering, etc.

The entropy decoder 210 may perform entropy decoding on the input bit stream to generate a quantized transformation coefficient. In this case, the entropy decoding method may be an inverse application of a method used by the entropy encoder 150 of FIG. 1.

The inverse quantizer 220 may receive the quantized transformation coefficient and perform inverse quantization. That is, an input value in a specific range may be changed to any one reference input value in a specific range depending on operations of the quantizer 140 and the inverse quantizer 220 and, in this procedure, error corresponding to a difference between the input value and the any one reference input value may occur.

The inverse transformer 230 may perform inverse transformation on data output from the inverse quantizer 220 and inversely apply the method used by the transformer 130 to perform inverse transformation. The inverse transformer 230 may perform inverse transformation to generate a restored residual block.

The adder 235 may add the restored residual block and the prediction block to generate a restored block. Here, the prediction block may be a block generated via inter encoding or intra encoding.

In the case of inter decoding (i.e., inter-frame decoding), the motion compensator 250 may receive or derive (derive from a surrounding block) motion information of a target block of decoding from the processing apparatus 100 for encoding and generate a prediction block based on the received or derived motion information. Here, the motion compensator 250 may generate the prediction block from the reference frame stored in the reference frame buffer 270. The motion information may include a motion vector, a reference frame index, etc. of a block with a highest temporal correlation with the target block.

Here, the reference frame buffer 270 may store some reference frames with a high correlation with a frame to be currently decoded. The reference frame may be a frame generated by filtering the aforementioned restored block. That is, the reference frame may be a frame formed by restoring the bit stream generated by the processing apparatus 100 for encoding. The reference frame used in the processing apparatus 200 for decoding may be the same as the reference frame used in the processing apparatus 100 for encoding.

In the case of intra decoding (intra frame decoding), the intra predictor 240 may perform spatial prediction from restored adjacent pixels in a current frame to generate a prediction value of the target block.

A position of the switch 255 may be changed depending on a prediction method of decoding of the target block.

The filter 260 may apply at least one of a deblocking filter, SAO, and ALF to the restored frame. The filtered restored frame may be stored in the reference frame buffer 270 and used as a reference frame.

The processing apparatus 200 may further include a parser (not shown) for parsing information related to an encoded frame included in a bit stream. The parser may include the entropy decoder 210 or the parser may be included in the entropy decoder 210.

As described above, the processing apparatus 100 for encoding may compress data of video via an encoding procedure and transmit the compressed data to the processing apparatus 200 for decoding. The processing apparatus 200 for decoding may decode the compressed data to reconfigure video content.

Hereafter, the operations of the processing apparatus 100 for encoding and the processing apparatus 200 for decoding will be described in more detail.

Figure 3:
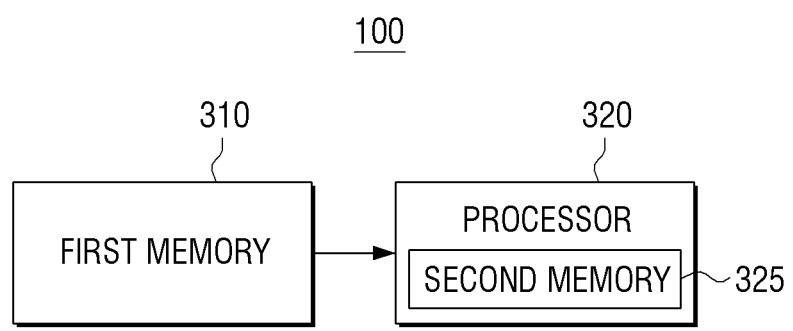
FIG. 3 is a schematic block diagram for explanation of a processing apparatus for encoding according to an exemplary embodiment of the present disclosure.

FIG. 3 is a schematic block diagram for explanation of the processing apparatus 100 for encoding according to an exemplary embodiment of the present disclosure.

As shown in FIG. 3, the processing apparatus 100 may include a first memory 310 and a processor 320.

The first memory 310 may be configured separately from the processor 320 and may be implemented with a hard disk, a non-volatile memory, a volatile memory, or the like.

The first memory 310 may store video content, a reference frame, etc. Here, the reference frame may be a restored frame of the frame encoded by the processor 320.

The first memory 310 may provide data to a second memory 325 included in the processor 320 or receive data from the second memory 325.

The processor 320 may control an overall operation of the processing apparatus 100.

The processor 320 may include the second memory 325. Here, the second memory 325 may be implemented with a cache memory, a register file, a buffer, or the like, which is included in the processor 320.

The second memory 325 may have a smaller capacity than the first memory 310, but have higher speed than the first memory 310. The second memory 325 may receive data from the first memory 310 and assist the processor 320 process the data. The second memory 325 may temporarily store the data processed by the processor 320 and may output the data to the first memory 310 according to control of the processor 320.

The processor 320 may receive and encode video content from the first memory 310. The processor 320 may divide a frame constituting the video content into a plurality of CUs and perform encoding on each of the plurality of CUs to generate an encoded frame.

Here, the plurality of CUs may be a largest coding unit (LCU). However, the present disclosure is not limited thereto and the processor 320 may divide a frame into a plurality of CUs with different sizes. In addition, all of the plurality of CUs may have different sizes. However, hereinafter, for convenience of description, the case in which a plurality of CUs have the same size will be described according to an exemplary embodiment.

The processor 320 may perform encoding on a plurality of CUs in a preset direction. For example, the processor 320 may perform encoding on the plurality of CUs in a diagonal direction toward a lower-left end from an upper-right end according to an exemplary embodiment. However, according to an exemplary embodiment, the present disclosure is not limited thereto and the processor 320 may encode the plurality of CUs in a different order.

The processor 320 may store position information of a current CU. The processor 320 may mange information stored in the second memory 325 based on the position information.

The operation of the processor 320 may reduce required capacity and bandwidth of the second memory 325, which will be described below in detail.

If a current CU is encoded based on a first encoding type, the processor 320 may load a first partial region of the reference frame, corresponding to first position information of the current CU, to the second memory 325 from the first memory 310 and perform encoding on the current CU and, if the current CU is encoded based on a second encoding type, the processor 320 may perform encoding on the current CU by using a reference pixel value corresponding to the first position information of the current CU from the second memory 325.

Here, the first encoding type may be inter encoding and the processor 320 may perform encoding on a plurality of CUs in a diagonal direction toward a lower-left end from an upper-right end and, upon completing inter encoding of the current CU, the processor 320 may load a region of the second partial region of the reference frame corresponding to second position information of a next CU, which does not overlap with the first partial region, to the second memory 325 and encode the next CU.

Upon completing inter encoding of the current CU, the processor 320 may delete a region of the first partial region of the reference frame stored in the second memory 325, which is not used in inter encoding of the next CU of the current CU.

The second encoding type may be intra encoding and the processor 320 may perform encoding on a plurality of CUs in a diagonal direction toward a lower-left end from an upper-right end and, upon completing intra encoding of a current CU, the processor 320 may restore the intra-encoded current CU, store a first reference pixel value to be used in intra encoding of the next CU in the second memory 325, and delete a second reference pixel value that is not used in intra encoding of a next CU among reference pixel values stored in the second memory 325.

The processor 320 may determine a preset extended region as the first partial region of the reference frame based on a region corresponding to the first position information of a current CU and determine at least some pixel values outside a current CU and an adjacent CU as a reference pixel value based on the first position information of the current CU.

Figure 4:
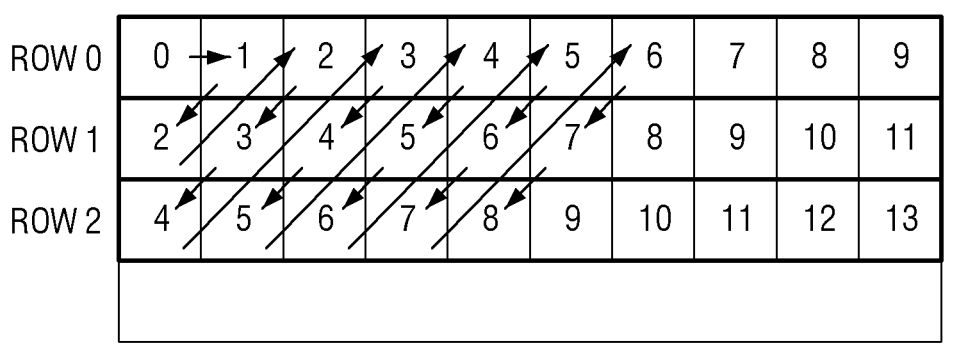

FIG. 4 is a diagram for explanation of encoding sequences of a plurality of CUs according to an exemplary embodiment of the present disclosure.

As shown in FIG. 4, the processor 320 may divide a frame into a plurality of CUs. Numbers indicated in the plurality of CUs represent encoding sequences of the plurality of CUs. In addition, the processor 320 may encode a plurality of CUs in an order indicated by the arrows.

The processor 320 may perform encoding on a plurality of CUs in an order to a right side from a left side in the same row. The processor 320 may perform encoding on a plurality of CUs in a diagonal direction toward a lower-left end from an upper-right end in the case of different rows. The processor 320 may simultaneously encode one or more CUs in different rows among a plurality of CUs.

For example, according to an exemplary embodiment, the processor 320 may encode CU #0 and, upon completing encoding of CU #0, the processor 320 may encode CU #1. The processor 320 may encode CU #2 upon completing encoding of CU #1.

In this case, two of total CUs #2 may be present such that the respective CUs #2 are positioned in Row 0 and Row 1, and the processor 320 may simultaneously encode the two of total CUs #2. That is, the processor 320 may simultaneously encode a plurality of non-adjacent CUs.

According to exemplary embodiment, the processor 320 may encode CU #2 of each of Row 0 and Row 1 in an order depicted by the arrows. That is, the processor 320 may perform encoding in an order of #0 of Row 0→#1 of Row 0→#2 of Row 1→#2 of Row 0→#3 of Row 1 . . . .

The encoding order shown in FIG. 4 is merely an exemplary embodiment and the processor 320 may perform encoding in a different order. For example, a distance between a plurality of CUs that are simultaneously processed in FIG. 4 is merely an embodiment and the processor 320 may simultaneously process a plurality of CUs with a long distance.

Figure 5A:
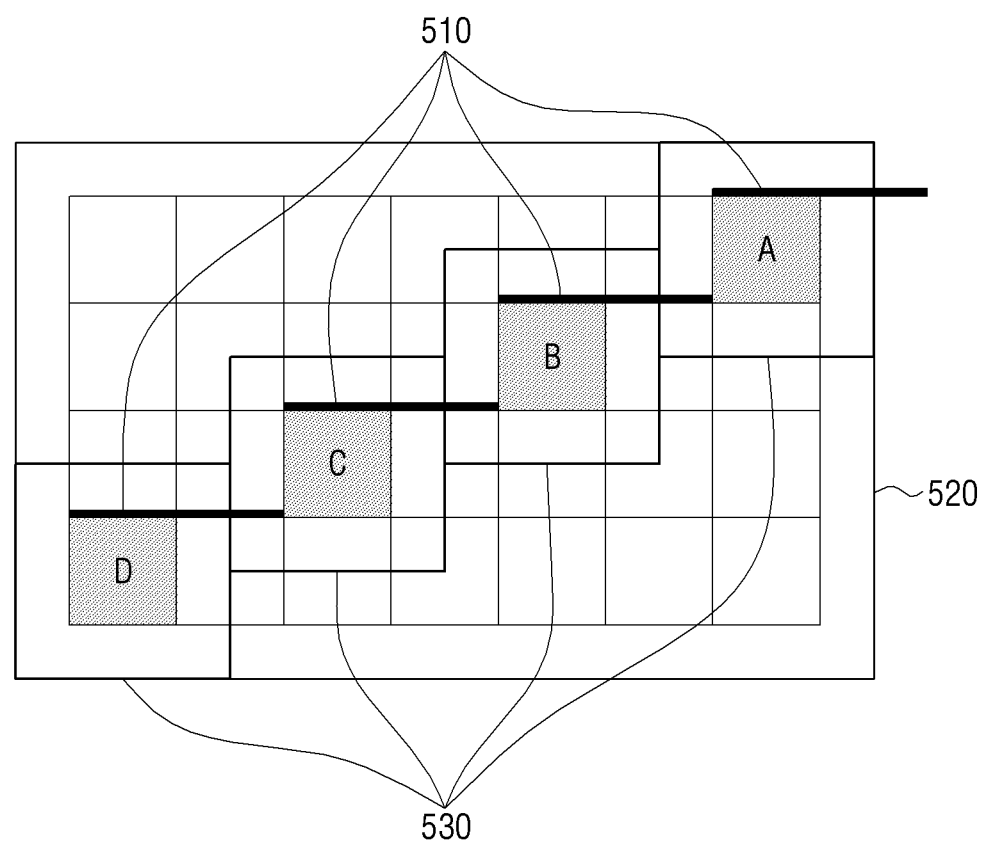
FIG. 5A is a diagram for schematically explanation of an operation in inter encoding and intra encoding according to an exemplary embodiment of the present disclosure.

FIG. 5A is a diagram for schematically explanation of an operation in inter encoding and intra encoding according to an exemplary embodiment of the present disclosure. In FIG. 5A, A, B, C, and D indicate a plurality of CUs that are simultaneously processed.

The processor 320 may store in the second memory 325, an upper pixel 510 required in intra encoding and a partial region 520 of a reference frame that is stored in the first memory 310 required in inter encoding. According to an exemplary embodiment, upper pixels 510 may be reference pixels above and outside of CUs A, B, C and D.

During inter encoding, the processor 320 may restore a frame on which encoding is already completed to generate a prediction block in a preset extended region 530 based on a region corresponding to a CU on which encoding is currently performed.

Here, the preset extended region 530 may be a region formed by extending a region corresponding to the CU, on which encoding is currently performed, in right, left, up, and down directions, in a reference frame. The reference frame may be a frame restored after encoding. In addition, the reference frame may be stored in a first memory 310.

The preset extended region of FIG. 5A is merely an exemplary embodiment and a region with a different size may be used. Generally, the preset extended region may use search regions in right, left, up, and down directions, which are 4 to 8 times greater than horizontal and vertical lengths of a CU.

As such, according to an exemplary embodiment, during inter encoding, the processor 320 may load only a partial region of a reference frame to the second memory 325 from the first memory 310 instead of loading an entire region of the reference frame to the second memory 325 from the first memory 310, thereby reducing a required bandwidth between the first memory 310 and the second memory 325.

During intra encoding, the processor 320 may perform intra encoding by using one or more pixel values outside a current CU and outside an adjacent CU based on position information of a current CU. According to an exemplary embodiment, the one or more pixel values may be above a current CU and/or above an adjacent CU based on position information of a current CU. For example, the processor 320 may perform intra encoding by using the upper pixel 510 of a current CU and the upper pixel 510 of a right adjacent CU of the current CU and a left pixel of the current CU. That is, according to an exemplary embodiment, the processor 320 may perform intra encoding by using the upper pixel 510, which is above the current CU, the upper pixel 510, which is above the right adjacent CU of the current CU, and the left pixel of the current CU.

In this case, a left pixel (not shown) of the current CU may be used by restoring a CU encoded immediately prior to encoding of the current CU.

Upon completing encoding of a CU encoded prior to the current CU, the processor 320 may restore a CU on which encoding is completely performed, store the upper pixel 510 included in the CU in the second memory 325, and use the upper pixel 510 in intra encoding of the current CU.

Upon completing intra encoding of a current CU, the processor 320 may restore the intra-encoded current CU and store a reference pixel value to be used in intra encoding of a next CU in the second memory 325.

The processor 320 may delete a reference pixel value that is not used in intra encoding of a next CU among the reference pixel values stored in the second memory 325.

The processor 320 encodes a plurality of CUs in the order shown in FIG. 4 and, thus, a capacity of reference pixels stored in the second memory 325 may be minimized during intra encoding, which will be described below in detail.

Figure 5B:
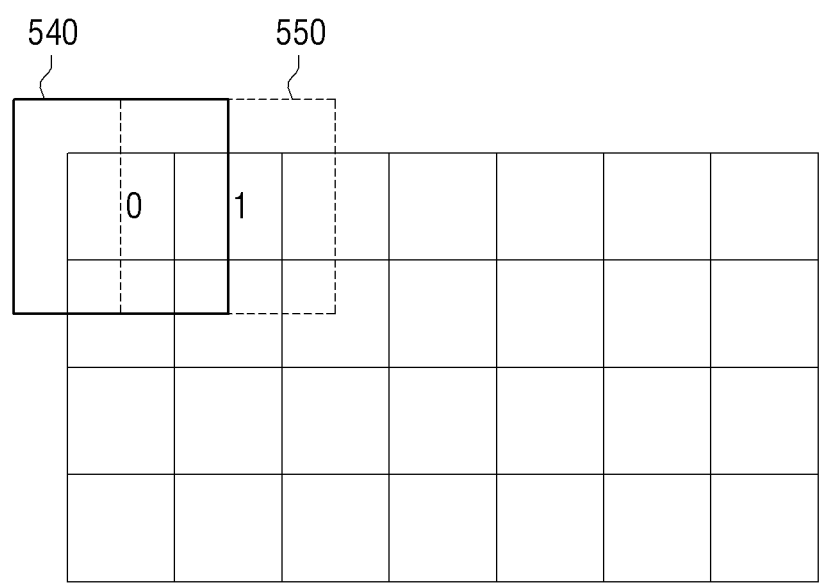
FIG. 5B is a diagram for schematically explanation of an operation during inter encoding according to another exemplary embodiment of the present disclosure.

FIG. 5B is a diagram for schematically explanation of an operation during inter encoding according to another exemplary embodiment of the present disclosure.

FIG. 5B shows the case in which a smaller region than the partial region 520 of the reference frame stored in the second memory 325 is loaded from the first memory 310 in FIG. 5A.

The processor 320 may load a first partial region 540 of the reference frame to the second memory 325 from the first memory 310 to perform inter encoding on CU #0. Upon completing inter encoding of CU #0, the processor 320 may perform inter encoding on CU #1 by using a second partial region 550 of a reference frame.

In this case, a left half region of the second partial region 550 is data loaded in inter encoding of CU #0 and, thus, may not need to be additionally loaded. That is, The processor 320 may load only a right half region of the second partial region 550 to the second memory 325 from the first memory 310 to perform inter encoding on CU #1.

Through the aforementioned operation, a required bandwidth between the first memory 310 and the second memory 325 may be reduced.

FIGS. 6A to 6E are diagrams for explanation of an operation of inter encoding in detail according to an exemplary embodiment of the present disclosure.

Figure 6A:
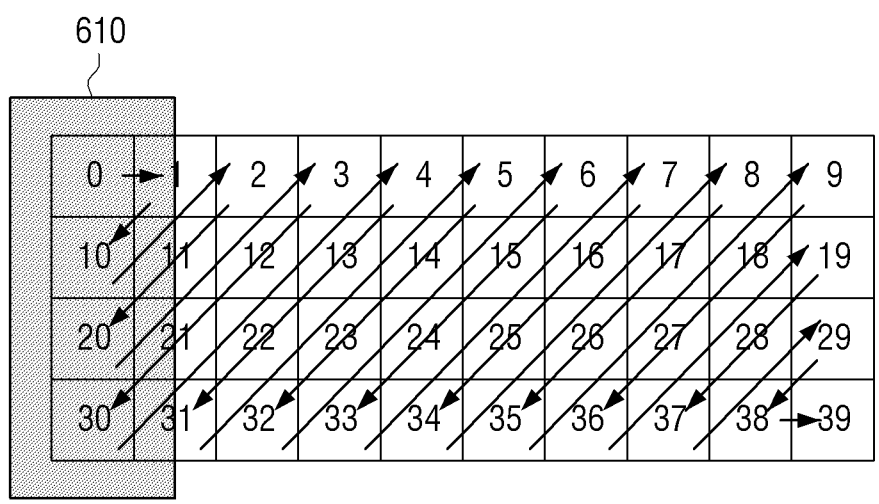
FIGS. 6A to 6E are diagrams for explanation of an operation of inter encoding in detail according to an exemplary embodiment of the present disclosure.

As shown in FIG. 6A, the processor 320 may load a first partial region 610 of a reference frame to the second memory 325 from the first memory 310 and perform inter encoding on CU #0 based on the loaded data.

Here, the first partial region 610 of FIG. 6A is merely an exemplary embodiment and data may be loaded to a region with a different size. The processor 320 may determine a size of a region of a loading target based on capacity, bandwidth, etc., of the second memory 325.

Figure 6B:
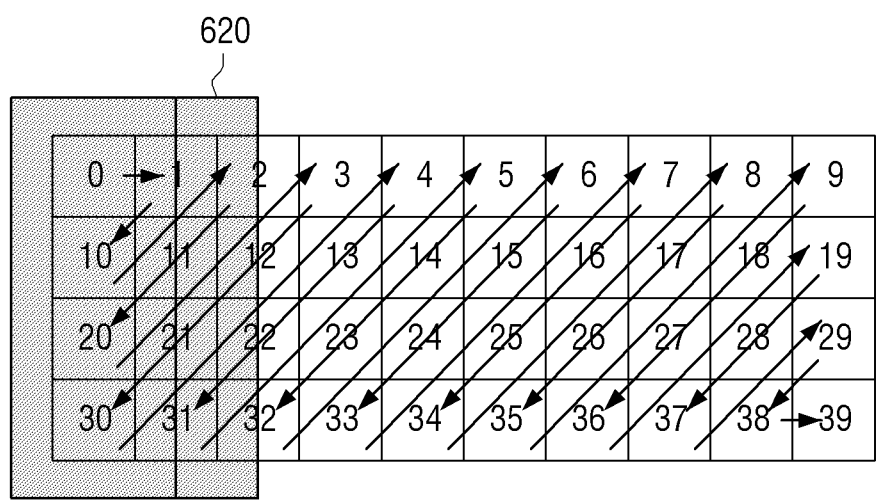

As shown in FIG. 6B, the processor 320 may load a second partial region 620 of a reference frame to the second memory 325 from the first memory 310 and perform inter encoding on CU #1 and CU #10 based on the loaded data.

In this case, the processor 320 may perform inter encoding on CU #10 by using data pre-stored in the second memory 325.

Figure 6C:
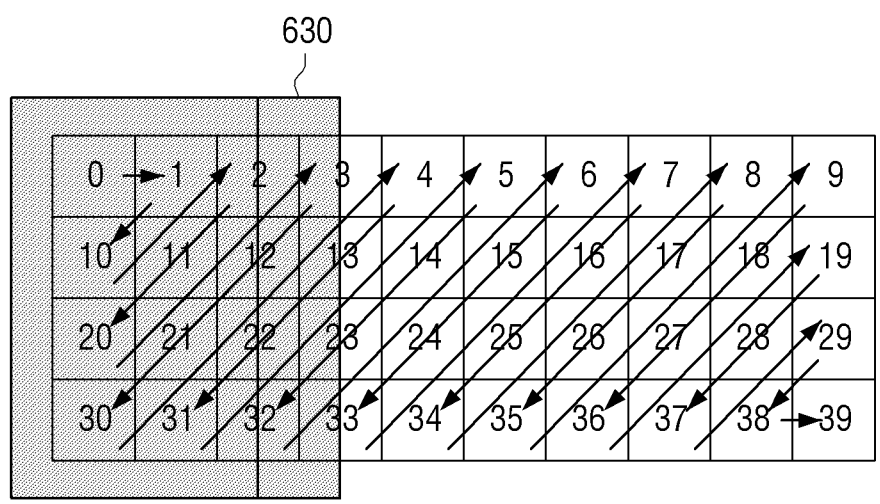

As shown in FIG. 6C, the processor 320 may load a third partial region 630 of a reference frame to the second memory 325 from the first memory 310 and perform inter encoding on CU #2, CU #11, and CU #20 based on the loaded data.

In this case, the processor 320 may perform inter encoding on CU #11 and CU #20 by using data pre-stored in the second memory 325.

Figure 6D:
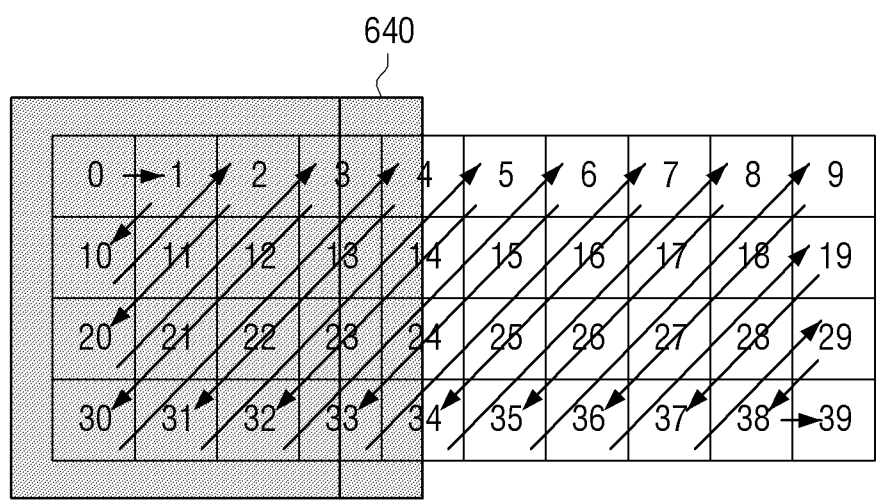

As shown in FIG. 6D, the processor 320 may load a fourth partial region 640 of a reference frame to the second memory 325 from the first memory 310 and perform inter encoding on CU #3, CU #12, CU #21, and CU #30 based on the loaded data.

In this case, the processor 320 may perform inter encoding on CU #12, CU #21, and CU #30 by using data pre-stored in the second memory 325.

Figure 6E:
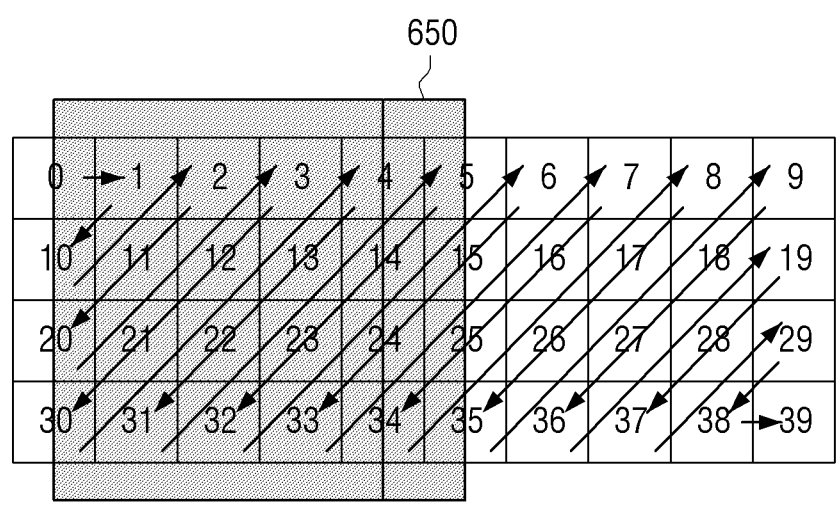

As shown in FIG. 6E, the processor 320 may load a fifth partial region 650 of a reference frame to the second memory 325 from the first memory 310 and perform inter encoding on CU #4, CU #13, CU #22, and CU #31 based on the loaded data.

In this case, the processor 320 may perform inter encoding on CU #13, CU #22, and CU #31 by using data pre-stored in the second memory 325.

In addition, the processor 320 may delete a left half region of the first partial region 610 from data stored in the second memory 325. According to an exemplary embodiment, the processor 320 may delete more than half the region of the first partial region 610 from data stored in the second memory 325 or less than half region of the first partial region 610 from data stored in the second memory 325. The amount of region of the first partial region being deleted may vary according to one or more exemplary embodiments.

Although FIGS. 6A to 6E show the case in which encoding is sequentially performed according to an exemplary embodiment, the present disclosure is not limited thereto. For example, the processor 320 may simultaneously perform inter encoding on CU #2 and CU #10. In this case, the processor 320 may also load a partial region of a reference frame required in inter encoding to the second memory 325 from the first memory 310 and delete a partial region that is not required in inter encoding from the second memory 325.

The processor 320 may apply the aforementioned method to all CUs to perform inter encoding.

Figure 7A:
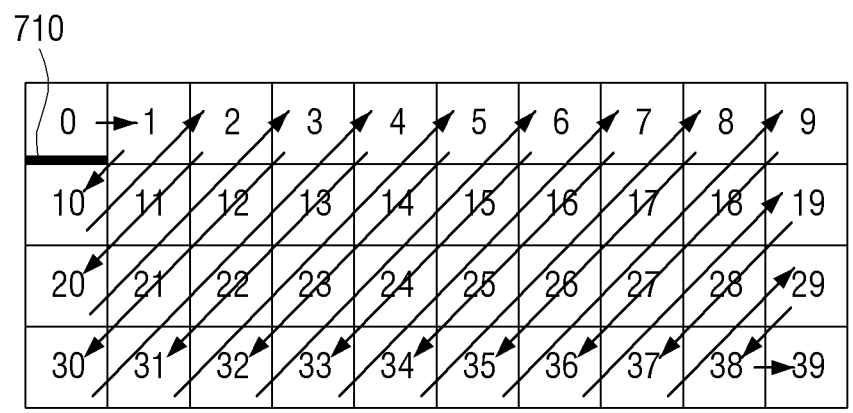
FIGS. 7A to 7C are diagrams for explanation of an operation of intra encoding in detail according to an embodiment of the present disclosure.
Figure 7B:
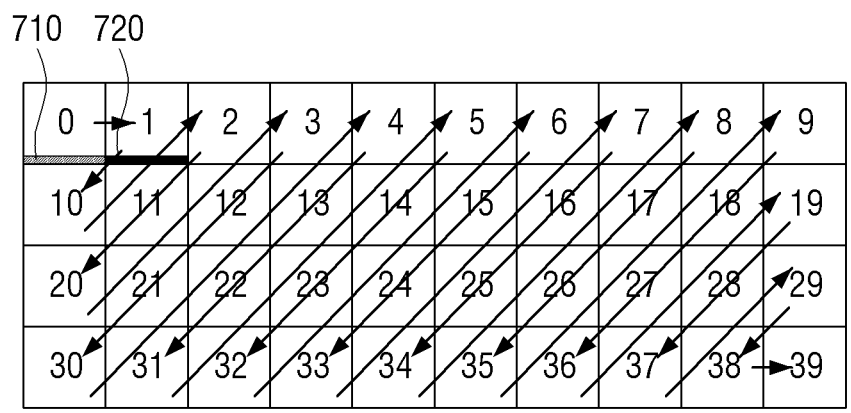
Figure 7C:
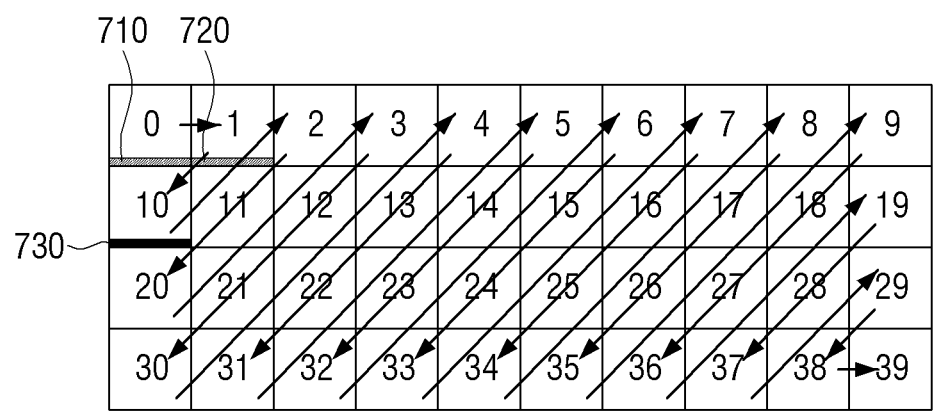

FIGS. 7A to 7C are diagrams for explanation of an operation of intra encoding in detail according to an exemplary embodiment of the present disclosure.

As described with reference to FIG. 5A, a left pixel of a current CU may be used via restoration after encoding of an immediately previous CU. Accordingly, the present disclosure will be described in terms of an upper pixel of a current CU (i.e., a reference pixel above the current CU) and an upper pixel of a right adjacent CU of the current CU (i.e., a reference pixel above the right adjacent CU of the current CU).

As shown in FIG. 7A, upon completing intra encoding of CU #0, the processor 320 may restore the intra-encoded CU #0 and store a first reference pixel value 710 to be used in intra encoding in a next CU in the second memory 325.

As shown in FIG. 7B, upon completing intra encoding of CU #1, the processor 320 may restore the intra-encoded CU #1 and store a second reference pixel value 720 to be used in intra encoding of a next CU in the second memory 325.

As shown in FIG. 7C, the processor 320 may perform intra encoding on CU #10 by using the first reference pixel value 710 and the second reference pixel value 720 which are stored in the second memory 325. According to an exemplary embodiment, the processor 320 may perform intra encoding on a current CU by using the first reference pixel 710 (i.e., upper pixel that is above the current CU), the first reference pixel 720 (i.e., upper pixel 510 that is above the right adjacent CU of the current CU) and the left pixel of the current CU.

Upon completing intra encoding of CU #10, the processor 320 may restore the intra-encoded CU #10 and store a third reference pixel value 730 to be used in intra encoding of a next CU in the second memory 325.

The processor 320 may delete a reference pixel value that is not used in intra encoding of a next CU among reference pixel values stored in the second memory 325. For example, the second reference pixel value 720 is used to perform intra encoding on CU #11 and, thus, the processor 320 may delete only the first reference pixel value 710. That is, the first reference pixel value 710 is not an upper pixel of CU #11.

According to the related art image processing method, intra encoding is sequentially perform from CU #0 to CU #9, and when intra encoding of CU #9 is completed, intra encoding is performed on CU #10. Accordingly, until intra encoding of CU #10 is completed and the first reference pixel value 710 is deleted, a reference pixel value corresponding to each of CU #0 to CU #9 needs to be stored in a second memory.

On the other hand, according to one or more exemplary embodiments of the present disclosure, until intra encoding of CU #10 is completed and the first reference pixel value 710 is deleted, the first reference pixel value 710 and the second reference pixel value 720 need to be stored in the second memory 325. Accordingly, a required capacity of the second memory 325 may be reduced.

With reference to FIGS. 7A to 7C, the case in which the processor 320 refers to an upper pixel of a current CU and a right adjacent CU of the current CU has been described. However, the present disclosure is not limited thereto and the processor 320 may refer to a pixel value in a different position. When a position of a pixel value to which the processor 320 refers is changed, an encoding order of a plurality of CUs may also be changed to corresponding to the changed position.

Although FIGS. 7A to 7C show the case in which encoding is sequentially performed, the present disclosure is not limited thereto. For example, the processor 320 may simultaneously perform intra encoding on CU #2 and CU #10.

The processor 320 may repeatedly perform the aforementioned procedure on the remaining CUs to perform intra encoding.

Figure 8:
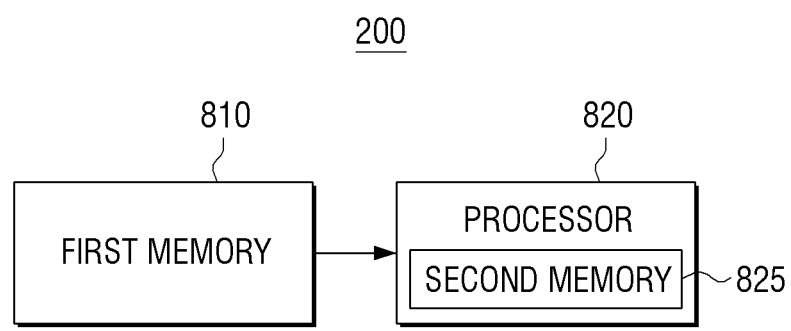
FIG. 8 is a schematic diagram for explanation of a processing apparatus for decoding according to an exemplary embodiment of the present disclosure.

FIG. 8 is a schematic diagram for explanation of the processing apparatus 200 for decoding according to an embodiment of the present disclosure.

As shown in FIG. 8, the processing apparatus 200 may include a first memory 810 and a processor 820.

The first memory 810 may be configured separately from the processor 820 and may be implemented with a hard disk, a non-volatile memory, a volatile memory, or the like.

The first memory 810 may store video content, a reference frame, etc. Here, the reference frame may be a restored frame formed by restoring encoded video content input from the processing apparatus 100 by the processor 820.

The first memory 810 may provide data to a second memory 825 included in the processor 820 or receive data from the second memory 825.

The processor 820 may control an overall operation of the processing apparatus 200.

The processor 820 may include the second memory 825. Here, the second memory 825 may be implemented with a cache memory, a register file, a buffer, or the like, which is included in the processor 820.

The second memory 825 may have a smaller capacity than the first memory 810 but have higher speed than the first memory 810. The second memory 825 may receive data from the first memory 810 and help the processor 820 process the data. The second memory 825 may temporarily process the data processed by the processor 820 and may output the data to the first memory 810 according to control of the processor 820.

The processor 820 may receive and decode the video content encoded from the first memory 310. The processor 820 may decode an encoded frame included in the encoded video content on a CU-by-CU basis to generate a decoded frame.

Here, the CU may be a largest coding unit (LCU). However, the present disclosure is not limited thereto and the processor 320 may perform decoding in units of CUs with a different size. The CU unit may be determined by the processing apparatus 100. However, hereinafter, for convenience of description, the case in which CUs have the same size will be described.

When a current CU is decoded based on a first decoding type, the processor 820 may load a first partial region of a reference frame corresponding to first position information of the current CU to the second memory 825 from the first memory 810 and decode the current CU and, when the current CU is decoded based on a second decoding type, the processor 820 may perform decoding on the current CU by using a reference pixel value corresponding to the first position information of the current CU from the second memory 825.

Here, the first decoding type may be inter decoding and, upon completing inter decoding of a current CU, the processor 820 may load a region of the second partial region of the reference frame corresponding to second position information of a next CU, which does not overlap with the first partial region, to the second memory 825 and may perform decoding on the next CU.

Upon completing inter decoding of the current CU, the processor 820 may delete a region of the first partial region of the reference frame stored in the second memory 825, which is not used in inter decoding of the next CU.

The second decoding type may be intra decoding and the processor 820 may store a first reference pixel value to be used in intra decoding of a next CU in the second memory 825 during intra decoding of the current CU and, upon completing intra decoding of the current CU, the processor 820 may delete a second reference pixel value that is not used in intra decoding of the next CU among reference pixel values stored in the second memory 825.

The processor 820 may determine a preset extended region as the first partial region of the reference frame based on a region corresponding to the first position information of a current CU and determine at least some pixel values outside a current CU and an adjacent CU as a reference pixel value based on the first position information of the current CU.

The processor 820 may store position information of the current CU. The processor 820 may manage information stored in the second memory 825 based on the position information.

The processor 820 may arrange a plurality of CUs, on which decoding is performed, in a preset direction to generate a decoded frame. For example, the processor 820 may arrange the plurality of CUs, on which decoding is performed, in a diagonal direction toward a lower-left end from an upper-right end to generate the decoded frame. Here, the preset direction may be a direction corresponding to an encoding order of the plurality of CUs. That is, the processor 820 may arrange the plurality of CUs, on which decoding is performed, to corresponding to the encoding order of the plurality of CUs to generate a decoded frame.

Through the aforementioned operation of the processor 820, a required capacity and bandwidth of the second memory 825 may be reduced.

A managing method of the second memory 825 of the processor 820 and a data transmitting method between the first memory 810 and the second memory 825 in the processing apparatus 200 for decoding are the same as in the processing apparatus 100 for encoding and, thus, repeated descriptions will not be given.

Figure 9:
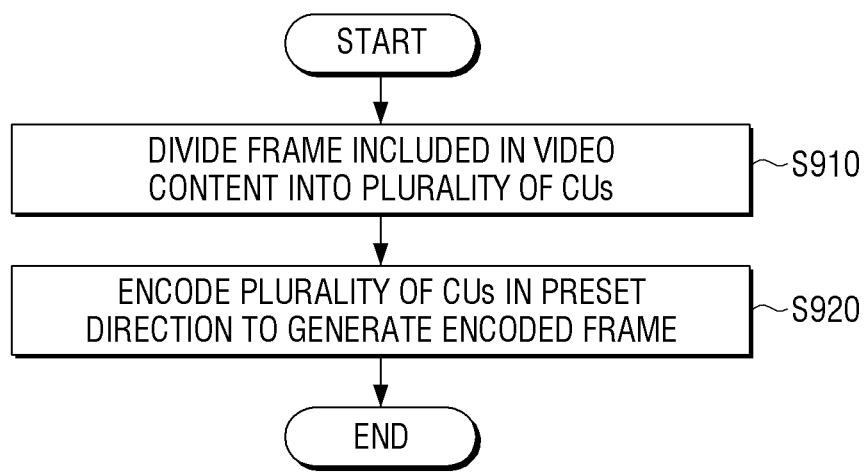
FIG. 9 is a flowchart for explanation of a controlling method of a processing apparatus for encoding according to an exemplary embodiment of the present disclosure.

FIG. 9 is a flowchart of a controlling method of a processing apparatus for encoding according to an exemplary embodiment of the present disclosure. Here, the processing apparatus may include a first memory and a processor and the processor may include a second memory.

First, a frame included in video content may be divided into a plurality of CUs (S910). In addition, encoding may be performed on the plurality of CUs in a preset direction to generate an encoded frame (S920).

In the generating of the encoded frame (S920), if a current CU is encoded based on a first encoding type, a first partial region of a reference frame corresponding to first position information of the current CU may be loaded to the second memory from the first memory and the current CU may be encoded and, if the current CU is encoded based on a second encoding type, the current CU may be encoded using a reference pixel value corresponding to first position information of the current CU from the second memory.

Here, the first encoding type may be inter encoding and, in the generating of the encoded frame (S920), a plurality of CUs may be encoded in a diagonal direction toward a lower-left end from an upper-right end and, upon completing inter encoding of the current CU, a region of the second partial region of the reference frame corresponding to the second position information of a next CU, which does not overlap with the first partial region, to the second memory and the next CU may be encoded.

In the generating of the encoded frame (S920), upon completing inter encoding of the current CU, a region of the first partial region of the reference frame stored in the second memory, which is not used in inter encoding of the next CU of the current CU, may be deleted.

The second encoding type may be intra encoding and, in the generating of the encoded frame (S920), a plurality of CUs may be encoded in a diagonal direction toward to a lower-left end from an upper-right end and, upon completing intra encoding of the current CU, the intra-encoded current CU may be restored, a first reference pixel value to be used in intra encoding of a next CU may be stored in the second memory, and a second reference pixel value that is not used in intra encoding of the next CU may be deleted among the reference pixel values stored in the second memory.

In the generating of the encoded frame (S920), a preset extended region may be determined as a first partial region of a reference frame based on a region corresponding to first position information of a current CU and at least one or more pixel values outside the current CU and an adjacent CU may be determined as a reference pixel value based on the first position information of the current CU.

Figure 10:
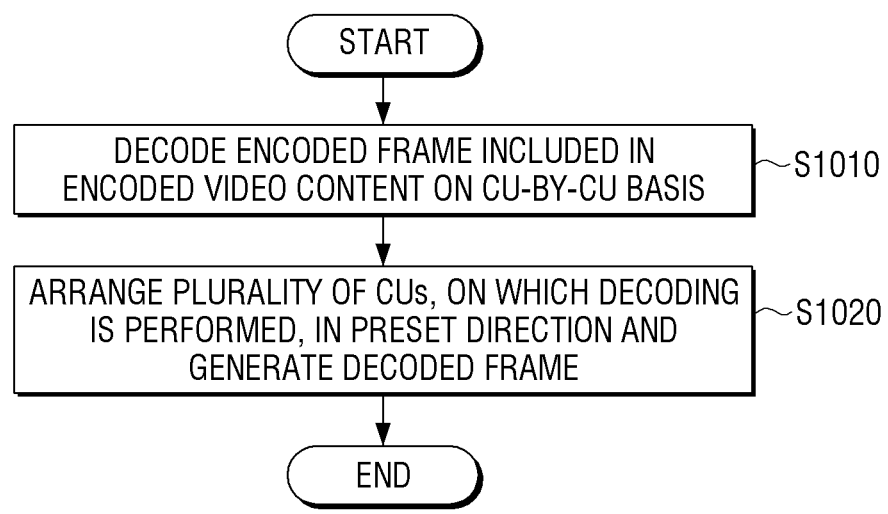
FIG. 10 is a flowchart for explanation of a controlling method of a processing apparatus for decoding according to an exemplary embodiment of the present disclosure.

FIG. 10 is a flowchart for explanation of a controlling method of a processing apparatus for decoding according to an embodiment of the present disclosure. Here, the processing apparatus may include a first memory and a processor and the processor may include a second memory.

First, an encoded frame included in encoded video content may be decoded on a CU-by-CU basis (S1010). In addition, a plurality of CUs on which decoding is performed may be arranged in a preset direction and a decoded frame may be generated (S1020).

In the decoding (S1010), if a current CU is decoded based on a first decoding type, a first partial region of a reference frame corresponding to first position information of the current CU may be loaded to the second memory from the first memory and the current CU may be decoded and, if the current CU is decoded based on a second decoding type, the current CU may be decoded using a reference pixel value corresponding to the first position information of the current CU from the second memory.

Here, the first decoding type may be inter decoding and, in the decoding (S1010), upon completing inter decoding of the current CU, a region of the second partial region of the reference frame corresponding to the second position information of a next CU, which does not overlap with the first partial region, may be loaded to the second memory, a next coding unit may be decoded, the plurality of CUs, on which decoding is performed, may be arranged in a diagonal direction toward a lower-left end from an upper-right end, and a decoded frame may be generated.

In the decoding (S1010), upon completing inter decoding of the current CU, a region of the first partial region of the reference frame stored in the second memory, which is not used in inter decoding of a next CU of the current CU, may be deleted.

The second decoding type may be intra decoding and, in the decoding (S1010), a first reference pixel value to be used in intra decoding of a next CU may be stored in the second memory during intra decoding of the current CU and, upon completing intra decoding of the current CU, a second reference pixel value that is not used in intra decoding of the next coding unit may be deleted among reference pixel values stored in the second memory may be deleted, the plurality of CUs, on which decoding is performed, may be arranged in a diagonal direction toward a lower-left end from an upper-right end, and a decoded frame may be generated.

In the decoding (S1010), a preset extended region may be determined as a first partial region of a reference frame based on a region corresponding to the first position information of the current CU and at least some pixel values outside the current CU and an adjacent CU may be determined as a reference pixel value based on the first position information of the current CU.

According to the aforementioned diverse exemplary embodiments of the present disclosure, processing apparatuses may load only a partial region of a reference frame to a second memory included in a processor from a first memory and effectively manage reference pixels stored in the second memory, thereby reducing a required capacity of the second memory and a bandwidth between the first memory and the second memory.

The aforementioned diverse exemplary embodiments of the present disclosure may be implemented in a recording medium readable by a computer or a similar device by using software, hardware, or a combination thereof. In some cases, the embodiments described in the disclosure may be implemented with a processor. In the software configuration, the embodiments such as the procedure and functions described in the disclosure may be implemented with separate software modules. The software modules may perform one or more functions and operations described in the disclosure.

According to an exemplary embodiment, the elements, components, methods or operations described herein may be implemented using hardware components, software components, or a combination thereof. For example, the hardware components may include a processing device. The processing device, such as the image processor or the controller, may be implemented using one or more general-purpose or special purpose computers, such as, for example, a processor, a controller and an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Computer instructions for performing a processing operation according to the aforementioned diverse exemplary embodiments of the present disclosure may be stored in a non-transitory computer-readable medium. The computer instructions stored in the non-transitory computer-readable medium may permit a specific device to perform the processing operations according to the diverse exemplary embodiments of the present disclosure upon being executed by a processor.

The non-transitory computer readable medium is a medium that semi-permanently stores data and from which data is readable by a device, but not a medium that stores data for a short time, such as register, a cache, a memory, and the like. In detail, the non-transitory computer readable medium may be, for example, a compact disc (CD), a digital versatile disc (DVD), a hard disc, a bluray disc, a universal serial bus (USB), a memory card, a read only memory (ROM), and the like.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A processing apparatus comprising:
a processor comprising a first memory, the processor configured to:
divide a frame in video content into a plurality of coding units (CUs), and
encode the plurality of CUs in a diagonal direction to generate an encoded frame;
wherein when a first CU is encoded based on a first encoding type, the processor is further configured to load, from a second memory, a first partial region of a reference frame corresponding to first position information of the first CU to the first memory and encode the first CU based on the first partial region of the reference frame loaded from the second memory, and
wherein, when the first CU is encoded based on a second encoding type, the processor is further configured to encode the first CU based on a first reference pixel value corresponding to the first position information of the first CU from the first memory,
wherein the processor is further configured to, based on a second CU being in existence at lower-left of the first CU in a diagonal direction of the first CU, encode the second CU at the lower-left of the first CU after the first CU is encoded.

2. The processing apparatus as claimed in claim 1, wherein the processor is further configured to encode the plurality of CUs from an upper-right end toward a lower-left end.

3. The processing apparatus as claimed in claim 1, wherein the first encoding type is inter encoding; and
wherein upon completing the inter encoding of the first CU, the processor is further configured to load a region of a second partial region of the reference frame corresponding to second position information of a third CU, which does not overlap with the first partial region, to the first memory and encode the third CU.

4. The processing apparatus as claimed in claim 3, wherein, upon completing the inter encoding of the first CU, the processor is further configured to delete a region of the first partial region of the reference frame stored in the first memory, which is not used in inter encoding of the third CU.

5. The processing apparatus as claimed in claim 4, wherein the first CU is a currently encoded CU and the third CU is next CU that is encoded subsequent to the first CU.

6. The processing apparatus as claimed in claim 1, wherein the second encoding type is intra encoding and upon completing the intra encoding of the first CU, the processor is further configured to restore the intra encoded first CU, store a second reference pixel value to be used in intra encoding of a third CU in the first memory, and delete a third reference pixel value that is not used in intra encoding of the third CU among reference pixel values stored in the first memory.

7. The processing apparatus as claimed in claim 1, wherein the processor is further configured to determine an extended region in the first CU as the first partial region of the reference frame based on a region corresponding to the first position information of the first CU and determine one or more pixel values outside the first CU and a third CU adjacent to the first CU, as the first reference pixel value based on the first position information of the first CU.

8. A processing apparatus comprising:
   a processor comprising a first memory, the processor configured to:
      divide a frame in video content into a plurality of coding units (CUs), and
      intra-frame encode the plurality of CUs in a diagonal direction to generate an encoded frame;
   wherein, when a first CU is encoded, the processor is further configured to encode the first CU based a first reference pixel value of a first reference pixel above the first CU, a second reference pixel value of a second reference pixel above a second CU, which is right adjacent to the first CU and a pixel value of a pixel within the first CU,
   wherein the processor is further configured to, based on a third CU being in existence at lower-left of the first CU in a diagonal direction of the first CU, encode the third CU at the lower-left of the first CU after the first CU is encoded.

9. The processing apparatus as claimed in claim 8, wherein upon completing the intra-frame encoding of the first CU, the processor is further configured to restore the intra encoded first CU, store a third reference pixel value to be used in intra encoding of a third CU in the first memory, and delete the first reference pixel value that is not used in intra encoding of the third CU.

10. The processing apparatus as claimed in claim 1, wherein the reference frame is different from the encoded frame.

11. The processing apparatus as claimed in claim 1, wherein when the first CU is encoded based on the first encoding type, the processor is further configured to load only the first partial region of the reference frame corresponding to the first position information of the first CU instead of loading an entire region of the reference frame.

* * * * *